United States Patent [19]

Iizuka et al.

[11] Patent Number: 5,547,699

[45] Date of Patent: Aug. 20, 1996

[54] MARINE MICRO-ALGAE FOOD MATERIAL CONTAINING DOCOSAHEXAENOIC ACID, FOOD CONTAINING THE SAME AND MANUFACTURING METHOD THEREFOR

[75] Inventors: Tokio Iizuka; Kenichi Uehara; Daizo Takeuchi, all of Chiba, Japan

[73] Assignee: Kawasaki Steel Corporation, Tokyo, Japan

[21] Appl. No.: 235,339

[22] Filed: Apr. 29, 1994

[30] Foreign Application Priority Data

Apr. 30, 1993 [JP] Japan ................................ 5-104828
Jun. 28, 1993 [JP] Japan ................................ 5-157361

[51] Int. Cl.$^6$ .......................... A23L 1/337; A23L 1/015; A23L 1/22; C12N 1/00
[52] U.S. Cl. ...................... 426/615; 426/49; 426/53; 435/243
[58] Field of Search .................. 426/615, 49, 53; 435/243

[56] References Cited

U.S. PATENT DOCUMENTS 5,130,242  7/1992  Barclay ............................. 426/49

FOREIGN PATENT DOCUMENTS 3-277242  12/1991  Japan .
4-346760  12/1992  Japan .
5-276963  10/1993  Japan .
5-308973  11/1993  Japan .
6-189744   7/1994  Japan .

OTHER PUBLICATIONS

Kyle et al Ind. Appl. Single Cell Oils, 1992, pp. 287–300 (Abstract only).
Kyle JAOCS, vol. 66, No. 5 (May 1989) pp. 648–651.
Henderson et al Phytochemistry, vol. 27, No. 6 pp. 1679–1683, 1988.
American Type Culture Collection: Catalogue of Protists–algae/protozoa, 16th edition, 1985.

*Primary Examiner*—Esther M. Kepplinger
*Assistant Examiner*—Choon P. Koh
*Attorney, Agent, or Firm*—Staas & Halsey

[57] ABSTRACT

A DHA-containing food material includes a marine micro algae containing docosahexaenoic acid (DHA). A method of manufacturing the DHA-containing food material has the steps of culturing the marine micro algae containing DHA, separating bodies of the algae, water-washing, disinfecting and drying the bodies of the algae. A DHA-containing food including the marine micro algae containing the DHA can be directly added to a food. A method of manufacturing the DHA-containing food material may include the steps of kneading the marine micro algae containing the DHA with a food material, and heating the kneaded material.

5 Claims, No Drawings

MARINE MICRO-ALGAE FOOD MATERIAL CONTAINING DOCOSAHEXAENOIC ACID, FOOD CONTAINING THE SAME AND MANUFACTURING METHOD THEREFOR

BACKGROUND OF THE INVENTION

1. Field of the Invention

The present invention relates to a food material containing docosahexaenoic acid ($C_{21}H_{31}CO_2H$), and more particularly to a food material that does not smell offensively of fish oil or the like. Also, the present invention relates to a food using the foregoing food material.

The docosahexaenoic acid is a highly-unsaturated fatty acid having, according to reports made recently, a variety of beneficial physiological functions, such as lowering cholesterol, preventing blood coagulation and improving learning capability.

2. Description of the Related Art

It has been known that the docosahexaenoic acid (hereinafter abbreviated to "DHA"), which is highly-unsaturated fatty acid reported to have a variety of beneficial physiological functions, is contained in fish oil. This fact has resulted in health foods, which use the fish oil as the raw material, being sold. However, health foods using the fish oil as the raw material encounter a difficulty in removing the smell of the fish. To alleviate this problem, the fish oil is usually formed into pills coated with gelatin or the like. However, under the foregoing circumstance, it is difficult to eat the food of the foregoing type when it is mixed with a usual food.

Since DHA can be oxidized very easily, a food which is manufactured by simply adding DHA or fish oil containing DHA cannot be cooked with heat in air. Hence, there arises a necessity of adding an antioxidation agent, or of using a means for preventing the contact with air.

Recently, a discovery of eye socket lipid textures of various fish containing highly-concentrated DHA and progress in technology of separating and refining the fatty acid found in the textures have enabled the DHA to be separated and refined. However, the necessity of using very expensive reagents to separate and refine the DHA increases the cost of the food. Moreover, there have been problems associated with a peculiar smell caused from the fish oil, an unstable supply of the raw material, and so forth.

In order to overcome the foregoing problems, a method has been discovered which causes microorganisms or the like to selectively produce DHA. For example, Pratima Bajpai et al., in their research, have reported that *Thraustochytrium aureum* belonging to lower fungi, produces DHA (APPL. MICROBIOL. BIOTECHNOL., 35,706 (1991)). However, because the aforementioned fungus is a photosynthetic fungus, it is necessary to use light to culture it, thus requiring a special and large-sized culturing apparatus. What is worse, other highly-unsaturated fatty acids, such as arachidonic acid and eicosapentaenoic acid, which have similar physical properties, are produced by 10 to 20 wt %, thus requiring an advanced separating and refining apparatus.

R. J. Henderson reported that the highly-unsaturated fatty acid contained in a lipid produced by *Crypthecodinium cohnii*, which is a marine micro algae performing no photosynthesis, is only DHA, and its content with respect to the overall weight of the fatty acid is 9 wt % (PHYTOCHEMISTRY, 27 (6) 1679 (1988)). However, there are problems in that the required static culturing method cannot be adapted to mass-quantity culturing, and that the content of the DHA is unsatisfactorily low. Further, International Publication Nos. WO91/11918 and WO92/12711 disclose a method of using a unicellular edible oil, which is extracted from *C. cohnii* and contains DHA, for mixed infant milk. In the method, when using DHA, a preventive measure for oxidation is also necessary, since DHA is extracted from marine algae.

SUMMARY OF THE INVENTION

Accordingly, a first object of the present invention is to provide a DHA food material substantially free from fish odor. A second object of the present invention is to provide a DHA-containing food material which does not require an oxidation-prevention process using gelatin. A third object of the present invention is to provide a DHA-containing food material which can be directly cooked with heat. A fourth object of the present invention is to provide a food material which can be stably supplied and which contains a high content of DHA. Other and further objects, features and advantages of the present invention will be appear more fully from the following description.

In accordance with the present invention, the inventors have found that the culture of the marine micro algae, cultured by liquid-submerged culturing or deep-liquid culturing, has improved the reproducibility of the bodies of the algae, enabled substantially only DHA to be selectively produced as the highly-unsaturated fatty acid, and considerably raised the content of the DHA in the lipid.

As a result, the raw material for the DHA can be stably supplied and the problem of the smell of fish can be overcome. However, employment of the foregoing method involving the extraction of DHA from algae requires a means for preventing the oxidation at the time of utilizing the DHA.

According to one aspect of the present invention, there is provided a DHA-containing food material comprising a marine micro algae containing DHA.

According to another aspect of the present invention, there is provided a DHA-containing food comprising the food material added thereto.

According to another aspect of the present invention, there are provided a method of manufacturing the food material and a method of manufacturing the food.

DETAILED DESCRIPTION OF THE PREFERRED EMBODIMENTS

According to the present invention, the content of DHA in lipid can considerably be raised by culturing marine micro algae having the capability of producing DHA by a liquid-submerged method. That is, it was found that culturing strains of *Crypthecodinium cohnii*, as marine micro algae, by the liquid-submerged method, will cause only DHA to be produced as a highly-unsaturated fatty acid, and that the content of the DHA in the whole fatty acid of lipid can be raised to about 40 wt %.

In addition to high DHA content, *Crypthecodinium cohnii* body has various important nutriments as shown in Table 1, for example.

TABLE 1

General Composition of Algae

| Composition | C. cohnii |
|---|---|
| Moisture | 3.9% |
| Protein | 18.7% |
| Lipid | 17.0% |
| Fiber | 1.6% |
| Ash | 7.6% |
| Glucide | 51.2% |
| Calorie | 511 Kcal/100 g |
| Pepsine Digestibility | 86.2% |
| Total Sugar | 38.8% |
| Direct Reduced Sugar | 4.6% |
| Starch | 28.2% |
| Vegetable Fiber | 10.1% |
| Vitamin | |
| Total Carotene | 13.2 mg % |
| Vitamin B1 | 14.0 mg % |
| Vitamin B2 | 2.67 mg % |
| Vitamin B6 | 0.75 mg % |
| Total Vitamin C | 26 mg % |
| Vitamin D | 220 IU/100 g |
| Vitamin E | 0.1 mg % or less |
| Choline | 0.31% |
| Folic Acid | 0.41 mg % |
| Pantothenic Acid | 3.27 mg % |
| Biotin | 0.997 mg % |
| Inositol | 209 mg % |
| Niacin | 29.8 mg % |
| Acid Number of Extracted Oil | 8.79 |
| Composition of Sterol | |
| Cholesterol | 1.3% |
| Brassicasterol | 22.3% |
| Stigmasterol | 7.2% |
| β-Sitosterol | 48.3% |
| Ergosterol | 5.1% |
| 7-Ergosterol | 0.6% |
| 7-Stigmasterol | 10.7% |
| Non-identified | 4.5% |

Also, the tests conducted in connection with the present invention have confirmed that the bodies of the algae containing DHA can themselves be used as a food. That is, the bodies of the algae exhibit satisfactory stability of the DHA, and the foregoing algae containing DHA also exhibit excellent digestion and absorption characteristics without a risk of toxicity.

Furthermore, the bodies of algae containing DHA are each spherical in shape and have primary particle sizes of about 10 μm, thereby facilitating their addition to a food material or the food in itself. That is, the bodies of the algae of the foregoing type can be conveniently carried or transported, can be stably preserved, and can easily be added and mixed with the food material or the food. Furthermore, the bodies of the algae have a characteristic that, even if the product forms secondary particles after it has been dried, the product can be added to a food without first pulverizing or cracking the secondary particles.

The microorganism used in the present invention may be marine micro algae of a type which is capable of producing the DHA, for example, algae of the Crypthecodinium genus, and in particular, the species *Crypthecodinium cohnii*. Specifically, *Crypthecodinium cohnii* ATCC 30021, 30543, 30556, 30571, 30572, 30575, 50051, 50053, 50055, 50056, 50058 and 50060 can be used.

The foregoing algae are known algae available from a preservation organization, such as ATCC (American Type Culture Collection). It is preferable for the present invention to use strains of *Crypthecodinium cohnii* ATCC 30021, because they exhibit excellent DHA producibility and satisfactory yield of the algae.

Further, use of varied strains obtained by subjecting the foregoing microorganism to known varying treatment, such as irradiating it with ultraviolet rays or by using any varying agent, is included in the scope of the present invention.

Culturing the marine micro algae is performed using the following culture mediums and methods.

The culture medium for the algae for use in the present invention may be any culture medium regardless of the composition if the algae according to the present invention are able to grow satisfactorily.

The culturing method may be one or more of stationary culturing, liquid-submerged culturing (rotational submerged culturing), liquid tank culturing, batch culturing, feeding culturing and continuous culturing. It is preferable to employ the liquid-submerged culturing method or the deep aeration stirring culturing method or the continuous culturing method, because mass production is enabled.

As for the methods for performing the liquid-submerged culturing or the deep aeration stirring culturing, a method such as that disclosed in Japanese Patent Application No. 04-077189 may be employed.

As for the method for performing continuous culturing, a method such as that disclosed in Japanese Patent Application No. 05-99656 may be employed.

By culturing the algae belonging to *Crypthecodinium cohnii* or the like, as the marine micro algae, by the liquid-submerged method as described above, only DHA can be produced as the highly-unsaturated fatty acid. Furthermore, a significant advantage can be obtained in that the ratio of the DHA to the overall weight of the fatty acid may be unexpectedly increased to about 40%.

The bodies of algae are extracted from a thus-obtained culture solution by filtration or centrifugal separation. Then, distilled water is used to wash the bodies of algae several times, if necessary.

If the bodies of the algae are completely killed by performing a possibly necessary disinfecting treatment, the quality of the product can be maintained even if the bodies of algae are preserved for a long time. The disinfecting treatment may be heat treatment, ethanol treatment or hot-water treatment.

According to the present invention, the thus-obtained wet bodies of algae or algae paste or the powder pellet prepared by drying the wet bodies can be used as the food material. The drying process includes heating, freezing and spray-drying processes and so forth. It is preferable that the heat-drying process is performed at 100° to 110° C. for about three hours. It is preferable that the freeze-drying process is performed for about 16 hours under a lowered pressure on the order of $10^{-1}$ to $10^{-2}$ mm Hg. It is preferable that the spray-drying process is performed with a spray dryer.

Since the food material according to the present invention smells of an oyster and the sea, the smell may be maintained if the smell is favorable for users. However, sometimes an odorless food is favorable, depending upon the food. In this case, the factors contributing to the smell can be removed by washing the bodies of the algae with alcohol or hydrocarbons, or removed by an extraction method using supercritical fluid of carbon dioxide.

The marine micro algae according to the present invention is in the form of spheres each having a diameter of approximately 10 μm, and therefore the spheres can easily be added to food material or a food. Even if the product, when subjected to the drying process, forms secondary particles, the intact addition of the product as secondary particles is allowable without cracking of the secondary particles. Alternatively, the dried product may be cracked to separate the particles from one another. Since the product can easily be formed into a pellet, the product may also be formed into pills.

Since the thus-dried powder of the algae exhibits excellent preservation stability because the vital actions of the algae as a fungus body are stopped, the powder of the algae can easily be transported. Because the DHA is present in the bodies of the algae, the DHA cannot be oxidized or denatured even if it is, as a food, heated or mixed with a weak acid or weak alkali. Therefore, the powder according to the present invention exhibits excellent preservation stability as DHA raw material for food.

Therefore, the bodies of the marine-algae according to the present invention can be added to any of a wide variety of foods while being formed into any of the following forms: boiled fish paste, boiled-fish paste food, cereal, cereal food, soybean food, a seasoning, a dairy good, a food extender, processed marine food, luxury food and nutrients.

The boiled paste for use in the present invention is exemplified by: livestock meats to be eaten, such as beef, pork or chicken; minced or ground seafood, such as fish or crustacea; and crushed or powdered products of konjak.

In the present invention, the following substances, which are usually added to boiled-fish paste foods, may be added as necessary: an extender; an antiseptic agent; a coagulant; an antioxidation agent; a coloring agent; an alcohol; a seasoning; and a spice.

The boiled-fish paste food to be manufactured in accordance with the present invention is exemplified by: a boiled fish paste sausage; a tubular roll of boiled fish paste; terrine; a sausage; a meatball; fish ham; a crab-flavored boiled fish paste sausage; a deep-fried patty of fish paste; a light puffy cake made of ground fish; dumplings for soup; shaomai; a fried dumpling stuffed with minced pork; an egg roll; wonton; ravioli; lasagna; konjak; and noodles made from devil's tongue starch.

The cereals for use in the present invention are exemplified by: wheat; rice (nonglutinous rice and glutinous rice); rye; oats; Indian corn; foxtail millet; Japanese millet; millet; buckwheat; arrowroot; and green peas. In place of the cereals, starches such as a white potato starch or a sweet potato starch may be used. The cereals are milled by a usual method to obtain a powder of the starch. As an alternative to this, grains of the cereals or seeds may be used.

The food to be manufactured according to the present invention is exemplified by: pasta (spaghetti, macaroni and the like); noodles such as buckwheat noodles, noodles and fine noodles; biscuits (biscuits, crackers, cookies and the like); breads; cakes; dry cereals (cornflakes and the like); rice; rice gruel; rice crackers; fried rice-cake; malted rice; gelatin noodles; and arrowroot powder.

The soybean food for use in the present invention is a food mainly composed of soybean and contains the bodies of the marine micro algae, the soybean food being exemplified by: tofu; a deep-fried tofu cutlet; soybean milk; deep-fried bean curd containing bits of various kinds of vegetables; soybean flour; and a sheet of dried soybean casein.

The soybean for use in the present invention may be powder obtained by cracking soybeans, soybean milk which is liquid obtained by extracting it from soybeans, or powder obtained by freezing and drying the extracted liquid. The soybean may be a material using a portion of the components of the soybean.

The seasoning (raw material for a condiment) for use in the present invention is exemplified by: vegetables such as tomato, onion, celery, carrot and pimentla sweet; their stocks; spices such as pepper, garlic, sage, thyme, and laurel; miso; egg; edible oils of a type which are liquid at room temperatures, such as corn oil, cottonseed oil and soybean oil; and extract of oyster-oil. As an alternative to this, any of the following materials on the market may be used: sauce, curry roux, tomato ketchup, sauce for roast meat or the like, miso, soy sauce, base of stew, base of soup and bouillon. If the extract of oyster-oil is used, either of the following liquids may be used: a concentrated liquid obtained by extracting shelled oyster with hot water; or a liquid obtained by concentrating an extract, which can be obtained during a process for preparing dry oyster in which raw oyster is heated with steam and then dried.

The seasoning food (prepared condiments) according to the present invention is exemplified by: Worcester sauce; sauce for a breaded pork cutlet; medium-rich sauce; oyster sauce; barbecue sauce; tomato ketchup; tomato puree; curry roux, base of white stew; sauce demi glace; sauce bechamel; miso; unrefined soy sauce; soy sauce; sauce for roast meat or Mongolian mutton barbecue or roast chicken; soup for buckwheat noodles; bouillon; mayonnaise; French dressing; southern island dressing; tartar sauce; extract of raw oyster; and its powder. Moreover, stock of various vegetables or boiled egg may be added to the mayonnaise or the dressing. Furthermore, a seasoning condiment which is commonly added to dressings, such as soy sauce, wasabi or chili sauce or mustard or spice may be added.

The health food containing the DHA according to the present invention is a health food containing docosahexaenoic acid in a large quantity. The health food may be a pill, the main component of which is the bodies of the marine-algae containing the DHA. As an alternative to this, the health food may be in the form in which the algae are contained in another food. Such food is exemplified by: a dairy product; a confectionery; and a health maintenance medicine such as calcium or vitamin. As specific products, the following foods are exemplified: milk, dairy beverage, lactic acid drink, butter, margarine, cheese, cheese food, yogurt, sour cream, calcium supplements, sugar-coated vitamin tablets, candy, nougat, drops, toffee and chocolate.

The dairy product for use in the present invention includes milk of cattle or a goat which is the raw material of a dairy product such as skim milk. The dairy product may be an imitation dairy product in which vegetable oil or vegetable protein is substituted in place of the milk as the raw material.

The confectionery for use in the present invention is exemplified by chocolate, drop, a glutinous starch syrup or sugar.

In the present invention, any of the following materials, which are usually added to the health food, may be added as necessary: an extender, a food preservative, a coagulating agent (a stabilizer), an antioxidation agent (exemplified by Vitamin E or C), a binder, a coloring agent, an alcohol, a dispersing agent, an emulsifier, an agar, gelatin, carrageenan (carragenone), water-soluble calcium, a spice or a sweetener. In the case where calcium, which is a health maintenance medicine, is added, calcium lactate and calcium phosphate are exemplified. It is preferable to use soluble calcium if the food according to the present invention is in the form of a beverage.

Nutritional food is exemplified by a health food having a high content of vitamins and iron content. The form of the health food containing vitamins and iron as well as including DHA is exemplified by a pill, a sugar-coated tablet, a capsule such as a soft capsule and a hard capsule, granules and powders. In order to prevent denaturing of the vitamins, it is preferable that a sugar coating containing a light-shielding substance be used to coat the material. In a case where the food is used in the form of a beverage, it is preferable to add an agar, gelatin, carrageenan (carragenone), soluble calcium, spice or sweetener, to make the beverage easier to drink and improve taste. If the food is used in the form of a pill, it is preferable that a binder and/or an antioxidation agent be added to improve the stability.

The seafood product according to the present invention contains artificially-formed products, powders or granules of luxury food, such as a food boiled down in soy and roe of a fish exemplified by ikralsalmon roe and caviar.

The food boiled down in soy is exemplified by: saltwater fish such as cuttlefish, cod and shrimp; freshwater fish, such as ayu and crucian fish; kombu; and laver. Also the following foods boiled down in soy may be used: vegetables, such as lotus roots, burdocks and butterburs, and stock farm meat, such as beef, pork or chicken.

The powder or granular food is exemplified by: kombu, fish, and crustacea and their roe. Also soup of meat or a vegetable, cocoa, malt, coffee, tea, green tea, dogtooth violet, wheat, arrowroot, skim milk, an extract, a cracked product and a granular product of a dried bird egg are similarly used.

The seafood product containing DHA according to the present invention is a food containing DHA in a large quantity. Specifically, it is a food in which the bodies of the marine-algae containing DHA are contained in the seafood product. Specifically, the following foods are exemplified: kombu tea; powder soup; powder of fish and shellfish; an artificially-formed product of a fish such as ikralsalmon roe; and fish boiled down in soy. Also any of the following materials may be used: cocoa; prepared cocoa; malt beverage; powdered coffee; powdered tea; powdered green tea; potato starch; a pre-mix such as okonomiyaki or pancake; arrowroot powder; skim milk; dried egg; and foods boiled down in soy which is stock farm meat or vegetables.

In the present invention, an extender, preservative, coagulating agent, antioxidation agent, coloring material and/or alcohol may be added as necessary.

EXAMPLES

The present invention will now be described in further detail with reference to the examples. The present invention is not, of course, limited to the following examples.

In the following examples, the content of DHA was measured by extracting coarse lipids from a dry fungus body by means of chloroform/methanol in a ratio of 2:1, forming the thus-extracted coarse lipids into fatty acid methyl ester by means of boron trifluoride methanol complex, and measuring the thus-produced DHA quantitatively by gas chromatography.

Example 1

Stocks of *Crypthecodinium cohnii* ATCC 30021 were, at 28° C., rotational-submerged-cultured for seven days, and the thus-obtained bodies of the algae were separated and taken from a culturing liquid by centrifugal separation. Then, dried bodies of the algae were obtained by means of water-washing and freeze-drying apparatuses. The dried bodies of the algae smelled of oyster and they appeared light yellow, while exhibiting a pepsin digestibility of 86.2%. As a result, fine powder serving as a satisfactory food material was obtained. An analysis of the dried bodies of the algae resulted in that about 20 wt % of the bodies of the algae was lipid and the composition of its fatty acid was as shown in Table 2.

TABLE 2

| Fatty Acid (*) | 10:0 | 12:0 | 14:0 | 16:0 | 16:1 | 18:0 | 18:1 | 18:2 | 20:5 | 22:6 (DHA) |
|---|---|---|---|---|---|---|---|---|---|---|
| Composition % | 0.49 | 2.12 | 18.99 | 28.38 | — | 2.25 | 7.83 | — | — | 39.94 |

(*) (number of carbons:number of double bonds)

An analysis of the bodies of the algae after heating them at 105° C. for five hours resulted in a determination, as shown in Table 3, that the composition of the fatty acid was not substantially changed from before heating.

TABLE 3

| Fatty Acid | 10:0 | 12:0 | 14:0 | 16:0 | 18:0 | 18:1 | 22:6 |
|---|---|---|---|---|---|---|---|
| Composition % | 0.44 | 2.51 | 18.33 | 29.03 | 3.06 | 7.31 | 39.32 |

Example 2

Water was added to the bodies of algae by a method similar to Example 1, so that a paste was obtained. Then, the paste was heated at 150° C. for one hour, and thus obtained dried bodies of algae were analyzed, resulting in a determination, as shown in Table 4, that the composition of the fatty acid was not substantially changed from before heating.

TABLE 4

| Fatty Acid | 10:0 | 12:0 | 14:0 | 16:0 | 18:0 | 18:1 | 22:6 |
|---|---|---|---|---|---|---|---|
| Composition % | 0.40 | 2.37 | 16.69 | 29.44 | 4.78 | 7.35 | 38.97 |

Example 3

Rapid Toxic Test

*Crypthecodinium cohnii* ATCC 30021 was cultured, and it was frozen and dried. The bodies of the algae were used to perform a rapid oral toxic test (limit test) based on the OECD chemical substance toxic test principle (1987) and using mice. Each of the ten mice used was a four-week-old and was previously bred, and the fact that the mice were in good health was confirmed. A sample of the bodies of the marine-algae was forcibly dosed in an amount of 2000 mg/kg in a single dosage by using a stomach sonde. As a result of an observation performed afterwards for 14 days, no deaths occurred. A general-state observation resulted in a showing that no abnormalities were found and a showing that no animal exhibited a restriction in weight increase. An organ check performed after the observation had been completed showed that the main internal organs were free from any abnormality. In accordance with the foregoing principle, a detailed test for obtaining an LD50 value is required where death is recognized due to the use of 2000 mg/kg. However, the foregoing test resulted in no deaths and no abnormalities of the organs. Therefore, it was confirmed that the fatal dose was 2000 mg/kg or more for both male and female samples. As described above, it was confirmed that the foregoing bodies of the algae do not create a problem regarding the rapid toxic test.

Example 4

10 g of dry bodies of the algae obtained by a method similar to Example 1, minced beef in a quantity of 10 times of the former, an adequate quantity of salt and pepper, bread crumbs, an egg serving as a binder material, and an onion previously cut into sizes of 2 to 3 mm$^2$ and heated were combined and kneaded, so that a hamburger was made. The foregoing food gave off a fragrance of oyster and had very favorable taste.

Example 5

10 g of dry bodies of the algae obtained by a method similar to Example 1, minced pork in a quantity of 10 times of the former, an adequate quantity of salt, a leak cut into small blocks, soy sauce and potato starch were combined and kneaded, so that minced meat in the form of spheres having diameters of 1 to 2 cm were made. Then, the minced meat was wrapped with a pancake of shaomai and steamed, so that shaomai was made. The foregoing food gave off a fragrance of oyster and had very favorable taste.

Example 6

10 g of dry bodies of the algae were obtained by a method similar to Example 1, wheat flour in a quantity of 10 times of the former, 5 g of dried egg and shortening were combined with one another and kneaded. Then, they were formed into a disc-like shape, and it was heated at 150° C. about 30 minutes, so that a biscuit was made. The foregoing food gave off a fragrance of oyster and had very favorable taste.

Example 7

10 g of dry bodies of the algae obtained by a method similar to Example 1, wheat flour in a quantity of 20 times of the former, 3 g of salt, 10 g of shortening, 110 ml of water and dried yeast were combined and kneaded, and then they were fermented at 30° C. for 4 hours. The thus-obtained bread base was again kneaded, gas-removal was performed, the base was formed as designed, and heated at 180° C. for one hour, so that a bread was baked. The foregoing food gave off a fragrance of oyster and had very favorable taste.

Example 8

10 g of dry bodies of the algae obtained by a method similar to Example 1 and flour of soybean in a quantity of 10 times of the former were mixed with each other, water was added, and heating and filtration processes took place. Then, a coagulating agent was added to the filtered liquid, followed by stirring and injection into a mold, so that soybean curd was made. The foregoing food gave off a fragrance of oyster and had very favorable taste.

Example 9

Using a mortar, dried bodies of the algae obtained by a method similar to Example 1 were made into a fine powder (having diameters of 10 to 100 μm), and 10 g of the fine powder was mixed with ketchup, the quantity of which was 10 times the fine powder. The ketchup mixed with the fine powder did not have any smell other than that of ketchup.

Comparative Example

Highly refined fish oil (AV=0.05, POV=1.5) was added to ketchup in a quantity identical to that of Example 9, resulting in ketchup comparable to Example 9.

The ketchup according to the example and that according to the comparative example were subjected to comparison tests evaluated by five panelists. The results are as shown in Table 5. The ketchup according to Example 9 exhibited excellent taste and smell.

TABLE 5

| Panelist No. | Ketchup according to Example 9 | | Ketchup according to Comparative Example | |
|---|---|---|---|---|
| | Taste | Smell | Taste | Smell |
| 1 | o | o | x | x |
| 2 | o | ⊙ | Δ | x |
| 3 | o | o | Δ | x |
| 4 | o | ⊙ | Δ | Δ |
| 5 | o | ⊙ | Δ | x |

Note
⊙: excellent
o: good
Δ: unsatisfactory
x: no good

Example 10

10 g of dry bodies of the algae obtained by a method similar to Example 1 and natural cheese in a quantity of 10 times of the former were heated and mixed with each other, so that DHA-enriched cheese food was made.

The foregoing food gave off a fragrance of oyster and had very favorable taste.

Example 11

10 g of wet bodies of the algae obtained in Example 1 and butter in a quantity of 10 times of the former were mixed and kneaded, so that DHA-enriched butter was made.

The foregoing food gave off a fragrance of oyster and had very favorable taste.

Example 12

0.1 g of vitamin E (an antioxidation agent) and 40 g of reducing malt sugar (a binder) were mixed with 100 g, in dry weight, of the bodies of the algae obtained in Example 1, so that raw tablets were manufactured. Then, a soft gelatin capsule base colored with caramel was used, so that the raw tablets were formed into soft capsule products under the presence of nitrogen gas.

The capsule products had no stink and were agreeable to take.

Example 13

A powder of wet vegetables, gelatin, beef extracts, salt and sugar were combined and mixed with 10 g of dry bodies of the algae obtained in Example 1 so that the total weight was 10 times the weight of the wet bodies of the algae. Then, the thus-prepared mixture was dried and disinfected, so that powdered soup was made.

By addition of hot water, the soup gave off a fragrance of oyster and had very favorable taste.

Example 14

10 g of dry bodies of the algae obtained by a method similar to Example 1 was, together with seasoning, such as salt, allowed to stick to a thin potato slice which was then fried in food oil, so that potato chips were manufactured. The foregoing food gave off a fragrance of oyster and had very favorable taste.

Potato chips manufactured as in Example 14 were subjected to panel tests to compare them with corresponding products on the market. The results were as shown in Table 6. As a result, it was confirmed that the potato chips according to the present invention are excellent foods equivalent to the products on the market, and give off a fragrance of oyster.

TABLE 6

| Panelist No. | Potato Chips on the Market | | Potato Chips according to Example 1 | |
|---|---|---|---|---|
| | Taste | Smell | Taste | Smell |
| 1 | o | ⊚ | o | o |
| 2 | o | ⊚ | o | o |
| 3 | o | ⊚ | o | o |

Note
⊚: excellent
o: good

The powder, paste or pellet food material according to the present invention has a high content of DHA. When it is used as a health food or added to a food in its raw form, it exhibits a variety of beneficial physiological functions, such as lowering cholesterol, preventing blood coagulation and improving learning capability.

The powder, pellet-form or paste-form bodies of the algae according to the present invention exhibit excellent preservation stability and satisfactory workability at the time of transporting the bodies of algae. The bodies of algae can easily be mixed with another food in a large quantity.

Furthermore, DHA in powder form exhibits excellent stability and cannot substantially be oxidized or denatured, even if it is heated at usual food preparation temperatures.

Although the invention has been described in its preferred form with a certain degree of particularly, it should be understood that the invention, as described, may be changed in the details of construction and the combination and arrangement of parts may be resorted without departing from the spirit and the scope of the invention as hereinafter claimed.

What is claimed is:

1. A DHA-containing food material comprising:

food material; and a strain of *Crypthecodinium cohnii*, a marine micro algae containing docosahexaenoic acid, designated by ATCC No. 30021, the strain being produced by a process comprising the steps of:

(a) culturing the strain of *Cryptthecodinium cohnii* by a liquid submerged method, the strain of *Cryptheco-dinium cohnii* having a pepsin digestibility in humans of at least 80%;

(b) separating bodies of the strain of *Crypthecodinium cohnii:*

(c) water-washing the bodies of the strain of *Crypthecodinium cohnii;*

(d) disinfecting the bodies of the strain of *Cryptheco-dinium cohnii;* and (e) drying the bodies of the strain of *Crypthecodinium cohnii.*

2. A DHA-containing food material according to claim 1, wherein the content of said docosahexaenoic acid is at least 2 wt % or more of said DHA-containing food material.

3. A method of manufacturing a DHA-containing food material for humans comprising the steps of:

(a) liquid submerged culturing a strain of *Crypthecodinium cohnii*, a marine micro algae containing DHA, designated by ATCC No. 30021, the strain of *Crypthecodinium cohnii* having a pepsin digestibility in humans of at least 80%;

(b) separating bodies of the strain of *Crypthecodinium cohnii;*

(c) water-washing the bodies of the strain of *Cryptheco-dinium cohnii;*

(d) disinfecting the bodies of the strain of *Crypthecodinium cohnii;*

(e) drying the bodies of the strain of *Crypthecodinium cohnii;* and (f) adding the bodies of the strain of *Crypthecodinium cohnii* to a food.

4. A method of manufacturing a DHA-containing food material according to claim 3, further comprising the step of washing said bodies of the *Crypthecodinium cohnii* with one of an alcohol or a hydrocarbon.

5. A method of manufacturing a DHA-containing food material according to claim 3, further comprising the step of removing odor by an extraction method using a supercritical fluid of carbon dioxide.

* * * * *